United States Patent [19]

Nieweg

[11] Patent Number: 5,049,272
[45] Date of Patent: Sep. 17, 1991

[54] FILTER CARTRIDGE WITH VENTED CAP

[75] Inventor: Heinrich Nieweg, Bielefeld, Fed. Rep. of Germany

[73] Assignee: Oxyphen AG, Zurich, Switzerland

[21] Appl. No.: 427,437

[22] Filed: Oct. 27, 1989

[30] Foreign Application Priority Data

Oct. 28, 1988 [DE] Fed. Rep. of Germany ... 8813571[U]

[51] Int. Cl.$^5$ .............................................. B01D 24/14
[52] U.S. Cl. .................... 210/266; 210/282; 210/472
[58] Field of Search ............ 210/282, 504, 502.1, 210/266, 496, 232, 244, 501, 503, 474, 482, 246, 472

[56] References Cited

U.S. PATENT DOCUMENTS

| | | | |
|---|---|---|---|
| 321,877 | 7/1885 | Abell | 210/474 |
| 2,336,348 | 12/1943 | Demers | 210/482 |
| 2,630,227 | 3/1953 | Rodwell | 210/265 |
| 3,327,859 | 6/1967 | Pall | 210/314 |
| 3,339,743 | 9/1967 | Bealle | 210/266 |
| 4,151,092 | 4/1979 | Grimm et al. | 210/261 |
| 4,283,283 | 8/1981 | Zimmerman | 210/282 |
| 4,306,971 | 12/1981 | Hankammer | 210/282 |
| 4,485,645 | 12/1984 | Mulder et al. | 210/498 |
| 4,505,727 | 3/1985 | Cullen et al. | 210/282 |
| 4,528,095 | 7/1985 | Byrne | 210/474 |
| 4,623,457 | 11/1986 | Hankammer | 210/482 |
| 4,666,600 | 5/1987 | Hankammer | 210/282 |
| 4,689,147 | 8/1987 | Leoncavallo et al. | 210/482 |
| 4,740,303 | 4/1988 | Greutert et al. | 210/498 |
| 4,741,828 | 5/1988 | Alhaüser et al. | 210/282 |
| 4,749,481 | 6/1988 | Wheatley | 210/282 |
| 4,764,274 | 8/1988 | Miller | 210/232 |
| 4,776,956 | 10/1988 | Gannaway | 210/282 |
| 4,828,692 | 5/1989 | Peranio | 210/266 |
| 4,885,089 | 12/1989 | Hankammer | 210/472 |
| 4,895,648 | 1/1990 | Hankammer | 210/188 |

Primary Examiner—Stanley Silverman
Assistant Examiner—Cynthia L. Nessler
Attorney, Agent, or Firm—Browdy and Neimark

[57] ABSTRACT

A filter cartridge (1) for use in a device for filtering liquids, in particular drinking water, comprises a beakerlike container (2) with a removable cap (3) and flow openings (4) and flow openings (9) disposed in the bottom (6) of the container, a granular filter composition (5) introduced into the container (2), and one sieve (7, 8) each disposed between the cap (3) and the filter composition (5), and between the bottom (6) and filter composition (5). The cap is embodied as a cone tapering toward the top (flat cone) and the sieve (7) associated with the cap is embodied corresponding to the cap (3) as a conical sieve, and its encompassing rim is welded to the cap (3). The sieve (8) associated with the bottom is embodied by an intrinsically flat disk and is welded with its encompassing rim to the bottom (6).

4 Claims, 4 Drawing Sheets

FILTER CARTRIDGE WITH VENTED CAP

FIELD OF THE INVENTION

The invention relates to a filter cartridge for use in a device for filtering liquids, in particular drinking water, comprising a beakerlike container having a removable lid with flowthrough openings, and flowthrough openings disposed in the bottom of the container, a granular filter composition introduced into the container and with a first sieve disposed between the cap and the filter composition and a second sieve between the bottom and the filter composition.

BACKGROUND OF THE INVENTION

Such a filter cartridge is known for instance from U.S. Pat. No. 2,630,227 and German Utility Model 7 017 889. There the two sieves rest loosely on or under the filter composition, so that shifting of the sieve from movement of the water and air is not precluded, which makes the retention action of the sieve inadequate in terms of preventing the granular filter composition from escaping.

Another disadvantage in the known filter cartridges is that venting is uncontrolled, so that the flow speed of the water is not controlled but instead proceeds unevenly and in fits and starts, so that the dwell time is varied and the dwell time required for optimal filtering is frequently not achieved.

SUMMARY OF THE INVENTION

It is an object of the invention to overcome deficiencies in the prior art, such as indicated above.

It is another object of the invention to improve the filter cartridge, having the general design of the type described above, to provide a secure positional fixation of the sieve to assure optimal retention action, and simultaneously to enable automatic control and stabilization of the flow of the water to be filtered, in combination with venting.

According to this invention these objects are attained by providing a beakerlike container having a removable lid or cap with flowthrough openings, and flowthrough openings disposed in the bottom of the container, a granular filter composition introduced into the container and one sieve each disposed between the cap and the filter composition and between the bottom and the filter composition, wherein the cap is embodied as a cone tapering toward the top (flat or truncated cone) and the top sieve associated with the cap is embodied as a conical sieve corresponding to the shape of the cap, and its encompassing rim is welded to the cap, and the bottom sieve associated with the bottom is embodied by an intrinsically flat disk and is welded with its encompassing rim to the bottom of the container, and in combination with the venting slits these characteristics result in optimal filtering action.

Advantageous further objects, features and the nature of the invention will be more apparent from the following description. The subject of the invention extends not only to the characteristics of the various individual aspects but also to their combination.

The filter cartridge according to the invention has a simple and inexpensive design, is easy to handle, and because of the welded connection of the sieves to the cartridge cap and cartridge bottom has very good and reliable retention action to prevent any escape of the granular filter composition resulting from the quantity of air and water flowing through it.

The filter cartridge is also equipped in the vicinity of the cap with venting slits, which effect a controlled venting and flow-through of the water to be filtered, and which because of the relation of the total of their cross sections determine the flow speed of the water and hence its dwell time for filtration, so that optimal cleaning of the water is assured.

With this filter cartridge, tap water is refined, and organic floating substances and other foreign substances are retained to the largest possible extent.

An exemplary embodiment of the invention will be described in detail below.

DESCRIPTION OF THE PREFERRED EMBODIMENT

Figure 2:
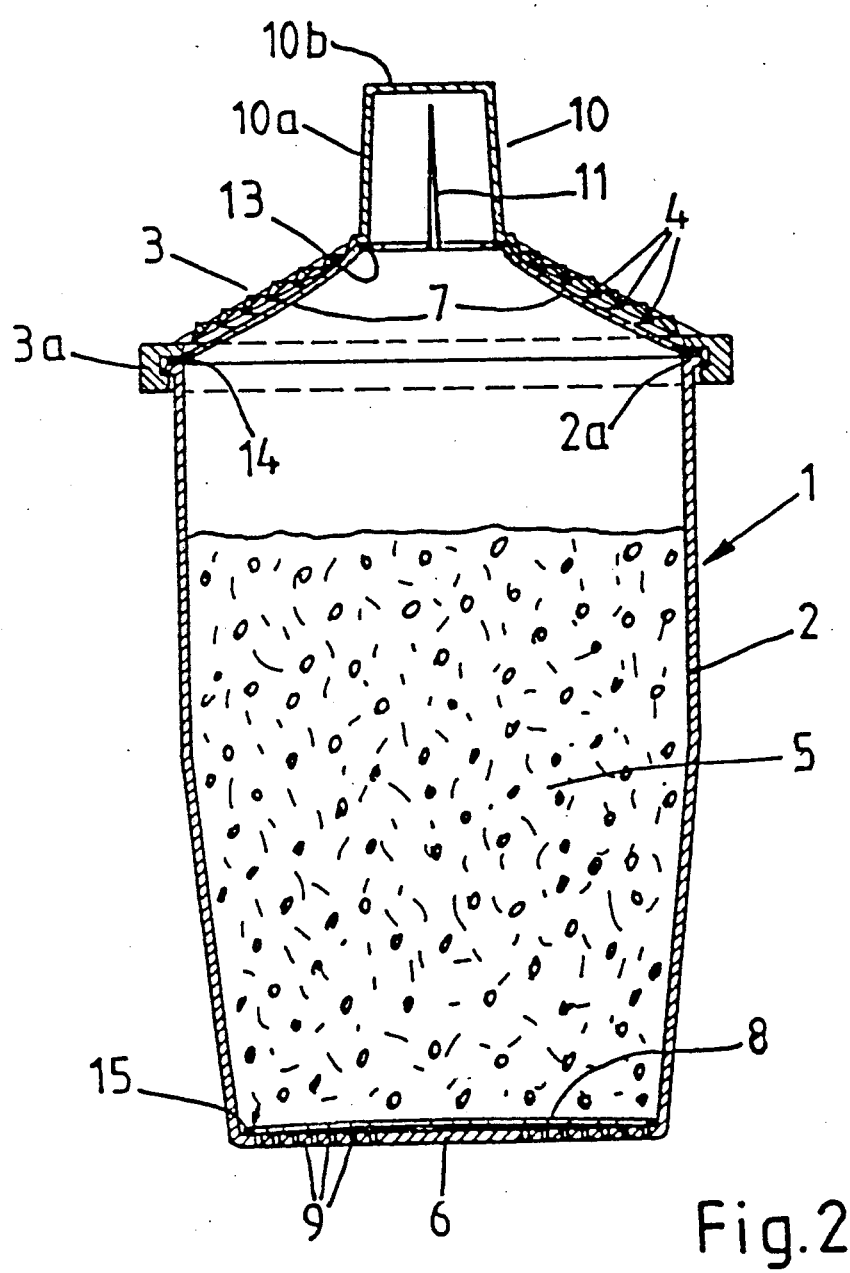
FIG. 2 is a longitudinal section through the filter cartridge.

Noting FIG. 2, the filter cartridge 1 for use in a unit or device for filtering liquids, in particular water, comprises a beakerlike container 2 with a removable cap 3 and flow openings 4, a granular filter composition 5 introduced into the container 2, a first or upper sieve 7 disposed between the cap 3 and the filter composition 5, and a second or lower sieve 8 between the container bottom 6 and the filter composition 5; flow openings 9 are also provided in the container bottom 6. The sieve 8 associated with the bottom is embodied by an intrinsically flat disk and is welded with its encompassing rim to the bottom 6.

The cap 3 is embodied as a cone tapering toward the top (flat or truncated cone), and the sieve 7 associated with the cap 3 is similarly shaped as a conical sieve and is welded at its encompassing rim to the cap 3. The conical cap 3 has a hollow dome 10 rising from the cap 3 and which is formed onto the tip of the cone; the dome has at least one venting slit 11 formed in the dome jacket or sidewall 10a.

Figure 3:
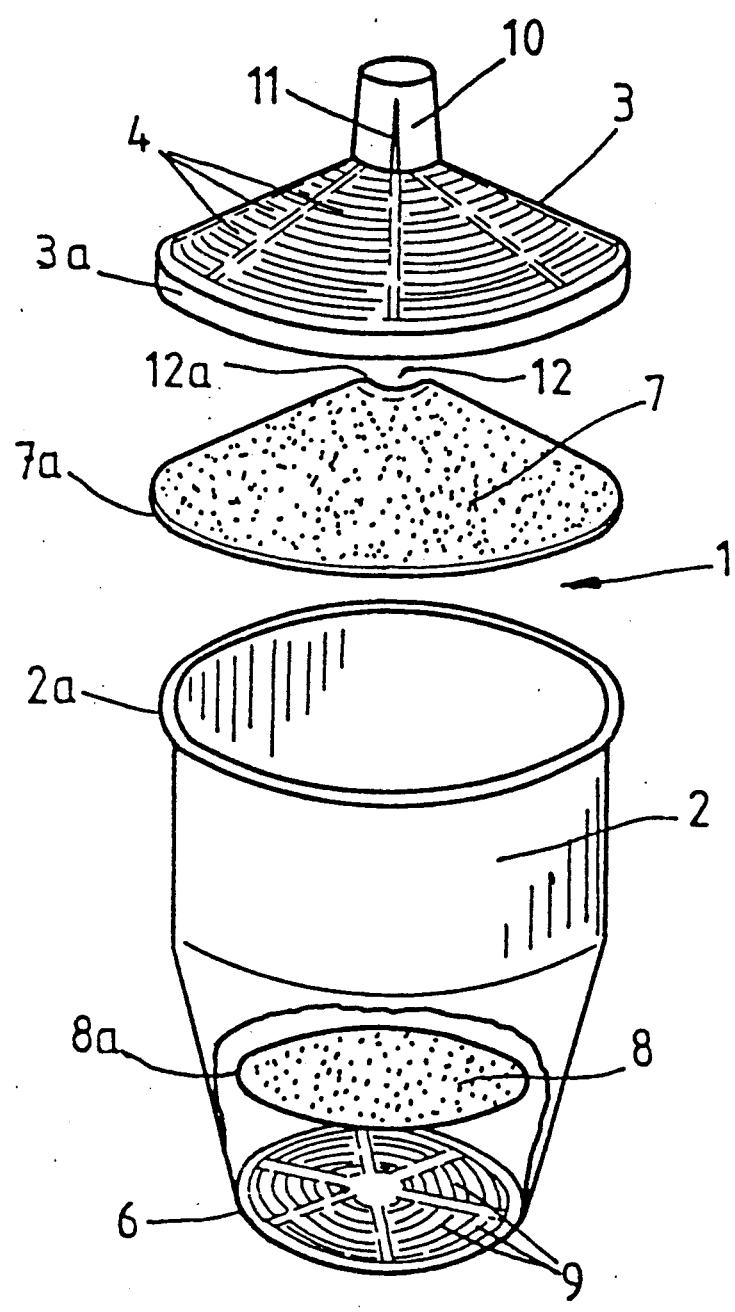
FIG. 3 is an exploded perspective view of the filter cartridge.
Figure 4:
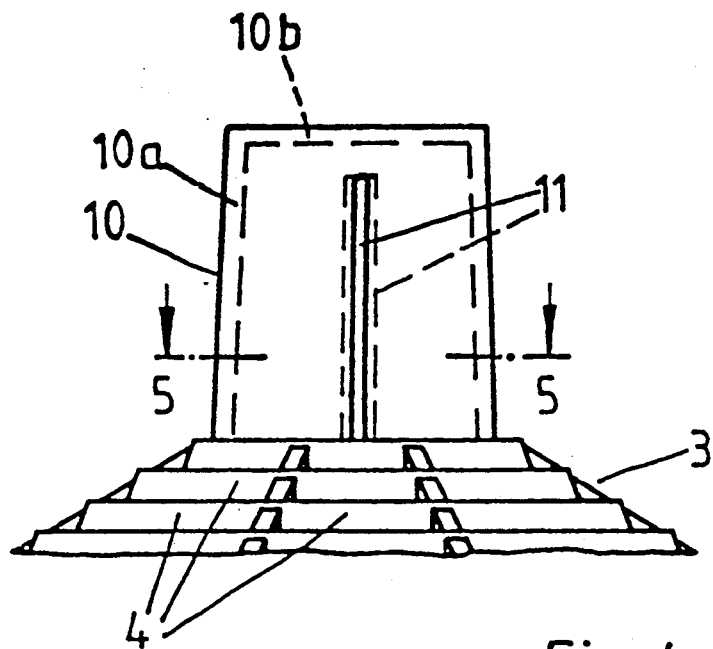
FIG. 4 is a side view of the removable cap of the filter cartridge.
Figure 5:
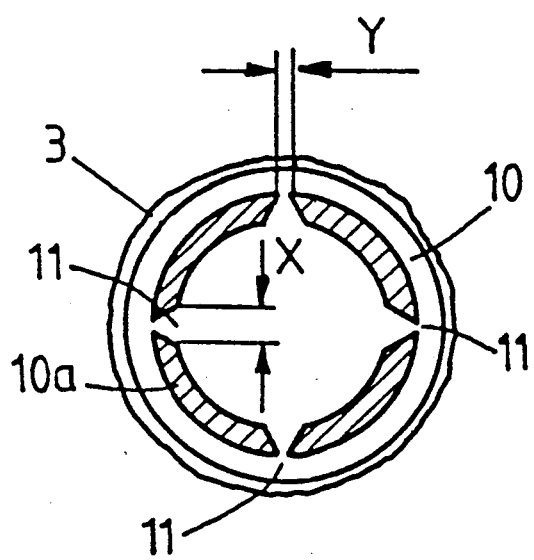
FIG. 5 is a cross section through the dome of the cap taken along the line A—A of FIG. 4.

It is preferable for a plurality of venting slits 11, for example four, to be recessed from the encompassing dome jacket 10a and distributed uniformly over the circumference; each venting slit 11 extends over the entire height of the dome, spaced apart from the dome cap 10b and comes to an end inside of the conical cap 3. Each venting slit 11 has a cross section that tapers from the maximum inside outwardly through the wall thickness of the dome jacket 10a; the smallest cross-sectional width of each venting slit 11 is smaller than the particle size of the filter composition 5. Preferably, each venting slit 11 has a slit width X of approximately 0.8 mm on the inside and a slit width Y of approximately 0.3 mm on the outside. Each venting slit 11 can have the same cross-sectional size over its entire height, as in FIG. 4, or may be embodied such that it tapers toward the top in cross section, as in FIGS. 2 and 3.

The dimensions of the venting slit or slits 11 in terms of their total venting cross section are such that the water running through the filter cartridge 1 has a variable dwell time dictated in accordance with an absorption or reaction time of the filter composition 5, so that essentially the venting speed determines the flow speed of the water through the filter composition 5, and the filter composition 5 itself affects the flow speed of the water. As a result of this kind of flow speed, approximately 95% of the harmful substances are removed from the water.

The sieve 7 associated with the cap has a hole 12 in the tip of the cone, corresponding to the dome 10, and the encompassing rim 12a of the hole and the encompassing rim 7a of the sieve are joined on the inside to the cap 3 at the weld points 13, 14, or along circular seams. The disklike sieve 8 is joined with its encompassing disk rim 8a to the bottom 6 at one or more weld point 15, or along the circular seam. The two sieves 7, 8 comprise a felted non-woven material, preferably plastic fleece, such as polypropylene or the like.

With an encompassing retaining strip 3a, the cap 3 extends over an outwardly oriented detent edge 2a of the container 2 and is joined reliably and detachably to the container 2 by means of this detent connection. The cap 3 is of plastic, preferably polyethylene or the like. The beakerlike container 2 comprises plastic and can be made of polystyrene for filtering cold water and of styrene acrylonitrile copolymer for filtering hot water.

The flow openings 4, 9 in the cap 3 and bottom 6 can be embodied by slits.

The filter composition 5 comprises a high-grade ion exchanger resin and special activated charcoal.

Figure 1:
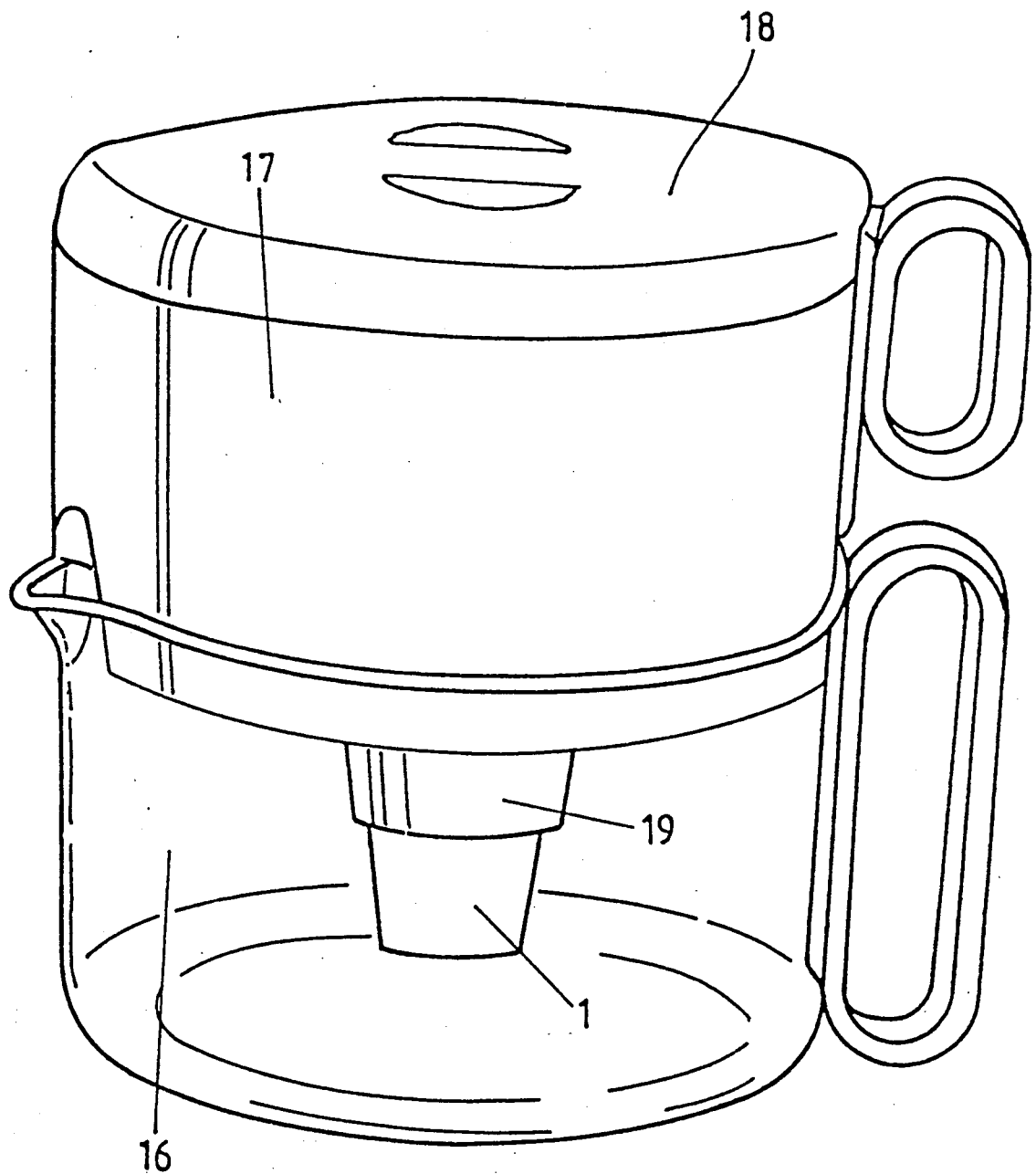
FIG. 1 is a perspective view of a water filtering unit, comprising a collecting vessel holding the filtered water, a filter holder mounted removably on it and holding the water to be filtered, the filter holder having a removable cap and a filter cartridge removably retained in the bottom of the filter holder and protruding into the collecting vessel.

The filter unit can be seen in FIG. 1, and has a collecting vessel 16 holding the filtered water and a filter holder 17 removably disposed on the collecting vessel and holding the water to be filtered, and the filter holder 17 also has a removable cap 18. The filter cartridge 1 is removably placed in the bottom of the filter holder 17, preferably in a formed-on neck 19, and the filter cartridge 1 protrudes into the collecting vessel 16.

The water to be filtered is introduced into the filter holder 17 and then runs through the slits 4 in the cap 3 of the filter cartridge 1 through the sieve 7 associated with the cap, through the filter composition 5, through the sieve 8 associated with the bottom, and through the slits 9 in the container bottom 6; on passing through the filter composition 5, the water is cleaned by ion exchange and absorption processes, so that the filtered water is then caught in the collecting vessel 16. In this passage of water, the air located in the collecting vessel 16 is simultaneously positively displaced and flows upward through the filter cartridge 1 and emerges from the venting slits 11; this venting determines the flow speed of the water to be filtered.

The two sieves 7, 8 prevent particles of filter composition 5 from being able to escape to the outside through the slits 9 in the bottom 6 or through the slits 4 in the cap 3.

After a certain water throughput, which depends on how hard the water is, the filter composition 5 is exhausted and must be replaced. To this end, the cartridge 1 is removed from the filter unit, its cap 3 is removed, and and the filter composition 5 is poured out and replaced with a new one.

Once the cap 3 has been set in place, the cartridge 1 is inserted into the filter unit again and the unit is then ready for operation again.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A filter cartridge for use in a device for filtering liquids, comprising a beakerlike container having a removable cap (3) with flowthrough openings, and flowthrough openings disposed in a bottom of the container, a granular filter composition in the container, a first sieve (7) disposed between the cap (3) and the filter composition and a second sieve disposed between the bottom and the filter composition, wherein the cap (3) comprises a cone tapering toward the top and the first sieve (7) is embodied as a conical sieve corresponding generally to the shape of the cap (3), and its encompassing rim is welded to the cap (3), and the second sieve is embodied by an intrinsically flat disk and is welded with its encompassing rim to the bottom; wherein the conical cap (3), in its conical tip, has a formed-on hollow dome (10) having a sidewall rising from the cap (3) and having at least one venting slit (11) recessed in the dome sidewall (10a); and wherein the first sieve (7) has a hole (12) located adjacent to the dome (10) and at the tip of the cone, and both the encompassing rim (12a) of the hole and the encompassing rim (7a) of the sieve are each joined by weld seams (13, 14) to the cap (3).

2. A filter cartridge for use in a device for filtering liquids, comprising a beakerlike container having a removable cap (3) with flowthrough openings, and flowthrough openings disposed in a bottom of the container, a granular filter composition (5) in the container, a first sieve (7) disposed between the cap (3) and the filter composition and a second sieve disposed between the bottom and the filter composition, wherein the cap (3) comprises a cone tapering toward the top and the first sieve (7) is embodied as a conical sieve corresponding generally to the shape of the cap (3), and its encompassing rim is welded to the cap (3), and the second sieve is embodied by an intrinsically flat disk and is welded with its encompassing rim to the bottom; wherein the conical cap (3), in its conical tip, has a formed-on hollow dome (10) having a sidewall rising from the cap (3) and having at least one venting slit (11) recessed in the dome sidewall (10a); wherein the dome (10) has a plurality of said venting slits (11), disposed uniformly over the circumference of said sidewall; wherein each venting slit is dimensioned in its total venting cross section in such a way that the water running through the filter cartridge has a dwell time dictated in accordance with an absorption or reaction time of the filter composition (5), so that the venting speed essentially determines the flow speed of the water through the filter composition (5); wherein each said venting slit (11) has a cross-sectional width which over its entire vertical length tapers toward the top in its cross-sectional width; and wherein the first sieve (7) has a hole (12) located adjacent to the dome

(10) and the tip of the cone, and both the encompassing rim (12a) of the hole and the encompassing rim (7a) of the sieve are each joined by weld seams (13, 14) to the cap (3).

3. A filter cartridge for use in a device for filtering liquids, comprising a beakerlike container having a removable cap (3) with flowthrough openings, and flowthrough openings disposed in a bottom of the container, a granular filter composition in the container, a first sieve (7) disposed between the cap (3) and the filter composition and a second sieve disposed between the bottom and the filter composition, wherein the cap (3) comprises a cone tapering toward the top and the first sieve (7) is embodied as a conical sieve corresponding generally to the shape of the cap (3), and its encompassing rim is welded to the cap (3), and the second sieve is embodied by an intrinsically flat disk and is welded with its encompassing rim to the bottom;

wherein the conical cap (3), in its conical tip, has a formed-on hollow dome (10) having a sidewall rising from the cap (3) and having at least one venting slit (11) recessed in the dome sidewall (10a); and wherein the first sieve (7) has a hole (12) located adjacent to the dome (10) and at the tip of the cone, and both the encompassing rim (12a) of the hole and the encompassing rim (7a) of the sieve are each joined by weld seams (13, 14) to the cap (3).

4. A filter cartridge for use in a device for filtering liquids, comprising a beakerlike container having a removable cap (3) with flowthrough openings, and flowthrough openings disposed in a bottom of the container, a granular filter composition (5) in the container, a first sieve (7) disposed between the cap (3) and the filter composition and a second sieve disposed between the bottom and the filter composition, wherein the cap (3) comprises a cone tapering toward the top and the first sieve (7) is embodied as a conical sieve corresponding generally to the shape of the cap (3), and its encompassing rim is welded to the cap (3), and the second sieve is embodied by an intrinsically flat disk and is welded with its encompassing rim to the bottom;

wherein the conical cap (3), in its conical tip, has a formed-on hollow dome (10) having a sidewall rising from the cap (3), and having at least one venting slit (11) recessed in the dome sidewall (10a);

wherein the dome (10) has a plurality of said venting slits (11), disposed uniformly over the circumference of said sidewall;

wherein each venting slit is dimensioned in its total venting cross section in such a way that the water running through the filter cartridge has a dwell time dictated in accordance with an absorption or reaction time of the filter composition (5), so that the venting speed essentially determines the flow speed of the water through the filter composition (5); and wherein the first sieve (7) has a hole (12) located adjacent to the dome (10) and the tip of the cone, and both the encompassing rim (12a) of the hole and the encompassing rim (7a) of the sieve are each joined by weld seams (13, 14) to the cap (3).

* * * * *